United States Patent Office 2,898,216
Patented Aug. 4, 1959

---

2,898,216

FRICTION MATERIAL

Horace Arthur Bray and Eric William Peppitt, Coventry, England, assignors to Dunlop Rubber Company Limited, London, England, a British company No Drawing. Application April 30, 1957
Serial No. 655,940

Claims priority, application Great Britain
May 23, 1956

8 Claims. (Cl. 106—36)

Our invention relates to improvements in friction material for brakes, clutches and the like, and more particularly relates to inorganic friction compositions.

Friction material for brakes, clutches and the like has been proposed comprising compressed, sintered, powdered material composed predominantly of copper and usually including tin, zinc, lead, aluminium or iron and one or more non-metallic substances such as silica, calcium oxide, alumina or graphite. The use of mullite ($3Al_2O_3.2SiO_2$), or a material containing a predominance of mullite, such as calcined kyanite, calcined sillimanite or calcined andalusite, is also known as an abrasive or friction material. Mullite may also be formed by heating and fusing together the proper stoichiometric proportions of alumina and silica. The principal advantage of mullite is that, when mixed with a suitable binding matrix, it provides a friction material which is relatively stable, and which retains a high coefficient of friction throughout its wear life.

Mullite, when used as a friction material for brakes and the like, has hitherto been compounded with metals such as copper, tin, zinc and the like, the principal constituent being copper. Modern aircraft brakes, however, operate at temperatures which may be sufficiently high to melt the metallic matrix in which the mullite is compounded, with deleterious results to the frictional coefficient of the material. Metals with very high melting points have been found to confer unsatisfactory friction properties.

Our invention provides friction material capable of working at very high temperatures, having a coefficient of friction which is substantially stable over a wide range of operating conditions and in which the rate of wear is low.

According to the present invention friction material for brakes, clutches and the like comprises a mixture of mullite, or a material containing a predominance of mullite, and an inorganic, non-metallic binder having a melting point of at least 1,100° C.

The inorganic, non-metallic binder may comprise manganese pyro-phosphate ($Mn_2P_2O_7$), or it may comprise asbestos, either in the form of powder or fibres or certain minerals such as china clay.

Other friction or wear modifiers, such as graphite and molybdenum disulphide, may be compounded into the friction material to improve its wear or frictional characteristics.

Typical compositions which may be used to produce a brake pad or lining for a heavy duty aircraft brake as as follows (the percentages of the ingredients being by weight):

*Example 1*

| | Percent |
|---|---|
| $Mn_2P_2O_7$ | 20–60 |
| Mullite | 40–80 |

*Example 2*

| | Percent |
|---|---|
| $Mn_2P_2O_7$ | 50 |
| Mullite | 40 |
| Graphite | 10 |

*Example 3*

| | Percent |
|---|---|
| $Mn_2P_2O_7$ | 40 |
| Mullite | 30 |
| Graphite | 15 |
| $MoS_2$ | 15 |

*Example 4*

| | Percent |
|---|---|
| $Mn_2P_2O_7$ | 20 |
| Mullite | 50 |
| $MoS_2$ | 30 |

*Example 5*

| | Percent |
|---|---|
| $Mn_2P_2O_7$ | 30 |
| Mullite | 45 |
| $Fe_3O_4$ | 10 |
| Graphite | 15 |

In any of the above examples, asbestos, in the form of powder or fibres, or a mineral such as china clay, may be used to replace the manganese pyrophosphate.

The mullite and binding material, and other friction and wear modifiers if used, are mixed together in powder form and may then be formed either by compacting under pressure, followed by heating, or by melting and casting into moulds or by pressing under heat. Such methods are well known in the art. It is also not always necessary to heat the materials of the binder to the melting point of the binder but only to a sufficiently high temperature to cause the binder to sinter or frit together. The pressure required is only that required to compact the material to the desired density. In the case of casting, obviously the melting point of the material must be reached. The temperature required to produce a pad will depend upon the binder used and generally will be between the melting point of the binder and 70% of that temperature. The friction article, which may be shaped and used in place of any existing friction article, may comprise a cup-shaped container containing the friction material or alternatively the friction material may be moulded around or pressed onto punched protuberances on a metal plate.

Friction material made in accordance with the invention has a low density, compared with known types of metal-bonded mullite friction material, conferring an advantage when used on aircraft brakes. The material also has a low thermal conductivity, compared with metal-bonded mullite, thus minimizing the heat transmitted during braking to the sealing rings and hydraulic liquid of a normal brake-applying mechanism.

Having now described our invention, what we claim is:

1. A molded friction pad for brakes and clutches consisting essentially of finely divided particles of mullite dispersed and embedded in an inorganic, non-metallic, binder having a melting point of at least 1100° C. and consisting essentially of manganese pyro-phosphate ($Mn_2P_2O_7$).

2. A molded friction pad for brakes and clutches consisting essentially of finely divided particles of mullite dispersed and embedded in an inorganic, non-metallic, binder having a melting point of at least 1100° C. and consisting essentially of manganese pyrophosphate, and comprising graphite compounded therein, 3. A molded friction pad for brakes and clutches consisting essentially of finely divided particles of mullite dispersed and embedded in an inorganic, nonmetallic, binder having a melting point of at least 1100° C. and comprising graphite and molybdenum disulphide compounded therein.

4. A molded friction pad for brakes, clutches and the like comprising a mixture of 20% to 60% of manganese pyrophosphate ($Mn_2P_2O_7$) and 40% to 80% of mullite.

5. A molded friction pad for brakes, clutches and the like comprising a mixture of 50% of $Mn_2P_2O_7$, 40% of mullite and 10% of graphite.

6. A molded friction pad for brakes, clutches and the like comprising a mixture of 40% of $Mn_2P_2O_7$, 30% of mullite, 15% of graphite and 15% of $MoS_2$.

7. A molded friction pad for brakes, clutches and the like comprising a mixture of 20% of $Mn_2P_2O_7$, 50% of mullite and 30% of $MoS_2$.

8. A molded friction pad for brakes, clutches and the like comprising a mixture of 30% of $Mn_2P_2O_7$, 45% of mullite, 10% of $Fe_3O_4$ and 15% of graphite.

References Cited in the file of this patent

UNITED STATES PATENTS

| | | |
|---|---|---|
| 1,292,953 | Jeppson | Jan. 28, 1919 |
| 2,284,785 | Wilkey | June 2, 1942 |
| 2,389,061 | Kuzmick | Nov. 13, 1945 |
| 2,408,430 | Lowey et al. | Oct. 1, 1946 |
| 2,431,327 | Geiger | Nov. 25, 1947 |
| 2,441,534 | Norton | May 11, 1948 |
| 2,479,504 | Moore et al. | Aug. 16, 1949 |
| 2,784,105 | Stedman et al. | Mar. 5, 1957 |

FOREIGN PATENTS

| | | |
|---|---|---|
| 740,820 | Great Britain | Nov. 10, 1952 |
| 1,105,902 | France | July 13, 1955 |

OTHER REFERENCES

Norton: "Refractories," pub. 1931 by McGraw-Hill, N.Y., (pages 26, 187, 191 and 312).